United States Patent
Anderson et al.

(10) Patent No.: US 10,777,015 B2
(45) Date of Patent: Sep. 15, 2020

(54) METHOD AND APPARATUS FOR OVERLAYING A REPRODUCTION OF A REAL SCENE WITH VIRTUAL IMAGE AND AUDIO DATA, AND A MOBILE DEVICE

(71) Applicant: 3DQR GmbH, Magdeburg (DE)

(72) Inventors: Daniel Anderson, Magdeburg (DE); Volker Bauer, Genthin (DE)

(73) Assignee: 3DQR GmbH, Magdeburg (DE)

( * ) Notice: Subject to any disclaimer, the term of this patent is extended or adjusted under 35 U.S.C. 154(b) by 0 days.

(21) Appl. No.: 16/406,287

(22) Filed: May 8, 2019

(65) Prior Publication Data

US 2019/0266803 A1 Aug. 29, 2019

Related U.S. Application Data

(63) Continuation of application No. PCT/EP2017/078464, filed on Nov. 7, 2017.

(30) Foreign Application Priority Data

Nov. 8, 2016 (DE) .......................... 10 2016 121 281

(51) Int. Cl.
*G06T 19/00* (2011.01)
*G06F 3/0346* (2013.01)
*G06F 3/0481* (2013.01)

(52) U.S. Cl.
CPC .......... *G06T 19/006* (2013.01); *G06F 3/0346* (2013.01); *G06F 3/0481* (2013.01); *G06F 2200/1637* (2013.01)

(58) Field of Classification Search
None
See application file for complete search history.

(56) References Cited

U.S. PATENT DOCUMENTS

2012/0113228 A1 5/2012 Konno et al.
2013/0010103 A1 1/2013 Ihara et al.
(Continued)

FOREIGN PATENT DOCUMENTS

KR 1020120082187 A 7/2012

OTHER PUBLICATIONS

Zhou, Zhiying, et al. "An experimental study on the role of 3D sound in augmented reality environment." Interacting with Computers 16.6 (2004): 1043-1068. (Year: 2004).*

(Continued)

*Primary Examiner* — Vu Nguyen
(74) *Attorney, Agent, or Firm* — Dorsey & Whitney LLP

(57) ABSTRACT

A method of overlaying an optical and acoustic reproduction of a real scene with virtual image and audio data comprises reading image data which represent an optical and/or acoustic reproduction of the real scene captured by at least one environment sensor of a mobile device, determining marker data from the image data, wherein the marker data represent a reproduction and a positioning of a marker arranged in the real scene, reading virtual image and audio data, wherein the virtual image and audio data comprise a representation instruction for representing the virtual image, a positioning instruction for positioning the virtual image and a positioning instruction for replay of the audio data, determining object data from the image and audio data, and ascertaining a positioning rule for positioning the virtual image with reference to the reproduction of the object portion using the object data and the virtual image and audio data.

16 Claims, 5 Drawing Sheets

(56) References Cited

U.S. PATENT DOCUMENTS

| | | | |
|---|---|---|---|
| 2013/0182858 A1* | 7/2013 | You | G06F 3/167 381/58 |
| 2014/0210858 A1 | 7/2014 | Kim | |
| 2014/0225914 A1* | 8/2014 | Kasahara | G06K 9/00899 345/629 |
| 2015/0279105 A1 | 10/2015 | Hanai et al. | |
| 2016/0093109 A1 | 3/2016 | Tawara | |
| 2019/0266803 A1 | 8/2019 | Anderson et al. | |

OTHER PUBLICATIONS

International Search Report and Written Opinion dated Jan. 1, 2018 in connection with International Patent Application No. PCT/EP2017/078464, 22 pages including English translation.
Kurkovsky, et al. "Current Issues in Handheld Augmented Reality." The 2nd International Conference on Communications and Information Technology: Information Technology and Cloud Computing, Hammamet. pp. 68-72.
Kan, et al. "Applying QR Code in Augmented Reality Applications." Department of Information and Communication, Yuan-Ze University, Taiwan. Dec. 14-15, 2009. pp. 253-257.
Bunma, et al. "Using Augmented Reality to Increase Capacity in QR Code." 2014 IEEE, pp. 440-443.
Zhou, et al. "An experimental study on the role of 3D sound in augmented reality environment." Interacting with Computers, 16, 2004, pp. 1043-1068.
Sodnik, et al. "Spatial Sound Localization in an Augmented Reality Environment." Nov. 2006, pp. 111-118.
Ruminski. "Modeling Spatial Sound in Contextual Augmented Reality Environments." 6 pages.
Kan et al. "QR code based augmented reality applications". Handbook of Augmented Reality. Springer New York, 2011. Chapter 16. pp. 339-354.
Teng et al. "Developing QR code based augmented reality using SIFT features". Ubiquitous Intelligence & Computing and 9th International Conference on UIC and ATC, IEEE, 2012. pp. 985-990.
Tsouknidas et al. "QR-code calibration for mobile augmented reality applications" A International AR Standards Meeting, Feb. 17, 2011, 1 page.
Yoon et al. "QR code data representation for mobile augmented reality". The International AR Standards Meeting. 2011. pp. 17-19.
Park et al. "Barcode-Assisted Planar Object Tracking Method for Mobile Augmented Reality". International Symposium on Ubiquitous Virtual Reality, Jul. 2011, pp. 40-43.

\* cited by examiner

METHOD AND APPARATUS FOR OVERLAYING A REPRODUCTION OF A REAL SCENE WITH VIRTUAL IMAGE AND AUDIO DATA, AND A MOBILE DEVICE

CROSS-REFERENCE TO RELATED APPLICATIONS

This application claims priority to PCT Application No. PCT/EP2017/078464 filed on Nov. 7, 2017 and entitled "Method And Apparatus For Superimposing Virtual Image And Audio Data On A Portrayal Of Real Scenery, And A Mobile Device", and German Patent Application DE 10 2016 121 281.4 filed on Nov. 8, 2016 and entitled VERFAHREN UND VORRICHTUNG ZUM ÜBERLAGERN EINES ABBILDS EINER REALEN SZENERIE MIT VIRTUELLEN BILD-UND AUDIODATEN UND EIN MOBILES GERÄT, each of which are incorporated by reference herein, in their entirety and for all purposes.

FIELD

The invention relates to a method of and an apparatus for overlaying a reproduction of a real scene with virtual image and audio data, wherein the method may for example be executed using a mobile device, and to a mobile device, such as a smartphone.

BACKGROUND

The basic concept of Augmented Reality (AR) has been existing for several decades and designates the overlay of real-time reproductions of reality (e.g. as a camera reproduction) with virtual information.

SUMMARY

It is the object of the invention to provide, with respect to the prior art, an improved method and an improved apparatus for overlaying a reproduction of a real scene with virtual image and audio data, and an improved mobile device.

This object is achieved by a method of and an apparatus for overlaying a reproduction of a real scene with virtual image and audio data, and by a mobile device according to the main claims. Advantageous variants and embodiments of the invention become obvious from the subsequent dependent claims.

The approach described specifically concerns the field of Augmented Reality overlaying in an optically and acoustically congruent manner, wherein virtual objects and audio data are linked with selected anchor points in the real scene in terms of position and orientation and are always superimposed in the three-dimensional scene in correct perspective as if they were part of the real environment. According to one embodiment, every single reproduction of a camera stream may be analyzed using image and/or audio processing methods, and the correspondingly necessary three-dimensional position and orientation of the virtual object may be calculated, in order to achieve this effect. Advantageously, the described approach allows for steady tracking of the scene during the movement of the observer.

Selection of the virtual object overlaying the real scene, also referred to as virtual image and audio object or virtual image and audio data in the following, may advantageously be performed using a marker, for example a QR code, present in the real scene. The object may be filed as three-dimensional storage in a database. Additionally or alternatively, the object may consist of a sequence of captures, for example photographs and/or acoustic recordings, taken from various angles (360°) and filed in the database. Three-dimensional data storage may include coordinates of a coordinate system defining points of the object or a single point and vectors for determining all other points of the object. The sequence of captures may be a sequence of two-dimensional captures. Each of the captures may image the object. Positioning of the virtual image and the audio data within a reproduction of the real scene may advantageously be performed using at least one object portion, for example an edge or a face of an object arranged in the surrounding of the marker in the real scene. A reproduction of this object portion may thus be used as a new and/or an additional anchor point for the virtual object. The marker may take up less than 1%, for example only 0.6% or even only 0.1% or even 0.01% of the reproduction of the real scene.

By using the marker, it may be ensured with little effort that the virtual image and audio data suitable for the real scene is selected. By using the object portion, it may be ensured that the virtual image and audio data can be positioned very accurately even in adverse conditions, for example bad light conditions. This positioning is possible even if the marker is no longer or only partially depicted in later reproductions of the real scene.

An optical image of an object is the reflection sensed by the eye of optically visible waves having a typical wavelength of 400-800 nm, which first hit the object and upon reflecting therefrom arrive in the eye of the observer. In the case of the light sources, the object itself—at given points—emits visible light. Similarly, an acoustic "image" of an object or an environment may be created by way of corresponding reflection of audible waves, for example at a typical frequency of 20-20000 Hz, which may be reflected by the object or the environment and may be interpreted by the is of the observer as a spatial "image". Like a light source, the object itself may also emit sound sources at different points and thus evoke a spatial impression (for example: orchestra). In a similar manner, blind people may create and reproduce a "spatial image" through click sounds and the reflection from the environment. Every echo sounder works in the same way; a spatial image/image of the object is created electronically out of the incoming sound waves and is displayed on a screen; in the same way it is possible to create a corresponding acoustic reproduction of the environment in the head of the observer.

The approach described here consists in representing the virtual image audio data in the reproduction of the environment shown on the screen and captured by the camera at all times while the observer is moving, in the correct order of magnitude and at the correct position and in the correct angular orientation relative to the marker, for example the QR code, and the image markers. A human then looks at this "overall image" and gets the impression of a seemingly real, unitary, camera-captured image. At the same time, the virtual image and/or audio object is supposed to emit sound at the volume or sound quality at all times and from every direction of the observer/listener exactly at those points at which this also happens in reality. Of course, the emitted sound waves are represented correctly in their frequency and/or volume depending on the distance and on the angle of the emitting object or in the corresponding distortion (Doppler effect) due to the movement of the emitting object. When "walking around" the object, individual sound sources thus will "disappear", whereas other sound sources will "emerge". It is exactly this representation process which is controlled in the screen and/or in the headphones by the approach described here.

Suitable known methods may be used for determining a marker and its positioning within the image data, for determining the image and audio data via the marker data and their positioning with respect to the reproduction, wherein many ways of achieving the corresponding sub-steps are known.

A method of overlaying a reproduction of a real scene with virtual three-dimensional or two-dimensional image and audio data comprises the following steps:

reading reproduction data which represent an image reproduction of the real scene captured by at least one environment sensor of a mobile device;

determining marker data from the image and audio data, wherein the marker data represent a reproduction and a positioning of a marker arranged in the real scene;

reading virtual image and audio data selected by the marker data. The read data, which consist of a plurality of virtual three-dimensional and/or two-dimensional image and audio data, also comprise a representation instruction for representing a virtual image, a positioning instruction for positioning the virtual image and a positioning instruction for representing acoustic data and/or a trigger for playing the audio data;

determining object data from the reproduction data, wherein the object data consist of an optical and/or acoustic three-dimensional reproduction or a series of two-dimensional photographs and/or sound recordings from various angles and a positioning of an object portion of an object arranged in the environment of the marker in the real scene;

ascertaining a positioning rule for positioning the virtual image and the acoustic data associated with this virtual image or the additional virtual audio data with reference to the reproduction of the object portion using the marker data, the object data and the virtual image and audio data.

The real scene may, for example, be a region of an environment of the mobile device lying within the sensing range of one or more of the environment sensors. The environment sensor may be an optical image sensor, and an optional further environment sensor may be an acoustic sound sensor, for example one or more cameras or microphones. The virtual reproduction may also be referred to as virtual image. The virtual reproduction may comprise a virtual image and audio data. The virtual image and audio data may comprise a representation instruction for image and/or sound representation of a three-dimensionally defined object and/or for representing a selection from image and/or acoustic captures captured from various angles, for example in form of two-dimensional photographs or sound captures of an object. The representation instruction may be used for overlaying the optical and acoustic reproduction of the real scene with the virtual three-dimensional or two-dimensional image and audio data. The reproduction from which the object data are determined in the step of determining may represent image and optionally audio data of the real scene captured using the environment sensor, which data may be displayed or output using the display devices and output devices of the mobile device.

The virtual image and audio data may represent any optical and acoustic representation, for example graphics, a symbol or writing, conversations, music or other sounds, which can be inserted into the reproduction of the real scene. The virtual image and audio data may represent a three-dimensional or also a two-dimensional image as well as associated audio data or a dot or a singular sound source.

The virtual image and audio data may be selected data. An overlay of the optical and acoustic reproduction of the real scene with the virtual image and audio data may include the optical and acoustic reproduction of the real scene, in which at least a portion is masked completely or for example in a semitransparent manner by the virtual image and audio data.

According to an embodiment, the virtual audio data comprise stereo audio data, which may be provided to a stereo loudspeaker via a suitable interface and may be output by the stereo loudspeaker, for example. Stereo audio data offer the advantage of conveying, to the listener, a direction in which a virtual sound source associated with the virtual audio data seems to be located. The virtual audio data may comprise the acoustic data which can be used for overlaying.

A marker may be a marker artificially placed in the scene, for example a geometrical marker, in the form of a code of pictogram. The marker may be realized as an artificial marker in the form of a one-dimensional or two-dimensional code. For example, the marker may be realized as a matrix with light and dark areas. The marker may represent optoelectronically readable writing. Data in the form of a symbol may be imaged in the marker. The marker data may comprise information on the reproduction of the marker and the positioning of the reproduction of the marker with reproduction of the real scene. In the further steps of the method, the marker data may be used completely or partially and, if necessary, also in a further processed form.

The positioning instruction for positioning the virtual image and audio data may be suitable for positioning the virtual image and audio data with respect to the reproduction of the marker in the reproduction of the real scene. The object portion may be a part, portion or region, for example an edge or face, or also an acoustically defined region of a real object. An object may be any item, for example a building, a fitment, a vehicle, a musical instrument or a piece of paper. The object portion may, for example, be an outer edge or an edge between faces angled with respect to each other of such an item. The object data may comprise information on the optical and acoustic reproduction of the object portion and a positioning of this reproduction within the reproduction of the real scene. In the further steps of the method, object data may be used completely or partially and, if necessary, also in a further processed form. The positioning rule may be suitable for positioning the virtual image and audio data with respect to the optical and acoustic reproduction of the object portion the corresponding reproduction of the real scene or a further reproduction of the real scene. The positioning rule may be ascertained using the positioning of the reproduction of the marker, the positioning of the optical and additionally or alternatively acoustic reproduction of the object portion and the positioning instruction.

The said object portion or the reproduction of the object portion may be regarded as a so-called anchor point. Such an anchor point may be used in addition to or as an alternative to the marker for positioning the virtual image and the acoustic data. Thus, it is not necessary to always use the marker, for example the QR code, itself for positioning the virtual object, i.e. the virtual image and the acoustic data. Instead, the marker may be extended by one or more anchor points from the environment of the marker so that the marker may also be tracked even when it is no longer in the image, i.e. in the reproduction of the real scenery displayed on a display device of the mobile device.

Hence, in the step of reading, the read reproduction data may represent or comprise also audio data in addition to the image data. The audio data are also referred to as sound data. The audio data may represent an acoustic reproduction of the real scenery captured by at least one further environment sensor of the mobile device. In this manner, for example, a soundscape associated with the captured optical image data may be recorded and processed. The further environment sensor may, for example, comprise a microphone or several microphones. When using several microphones or a directional microphone, a sound source emitting the captured audio data may be localized. Corresponding localization information may be matched with the captured image data.

According to an embodiment, the method of overlaying a reproduction of a real scene with virtual image and audio data comprises the following steps:

reading optical and additionally or alternatively acoustic image and audio data, wherein the image and audio data represent a reproduction of the real scene captured by an environment sensor of a mobile device;

determining marker data from the image and audio data, wherein the marker data represent a reproduction and a positioning of a marker arranged in the real scene;

reading virtual image and sound data, wherein the virtual data represent three-dimensional or a series of two-dimensional captures of image and sound data selected from a plurality of virtual data using the marker data, wherein the virtual image and sound data comprise a representation instruction for representing the virtual image and a positioning instruction for positioning the virtual image as well as a trigger position for playing the virtual audio data;

determining object data from the image and sound data, wherein the object data represent a reproduction and a positioning of object portion of an optically and additionally or alternatively acoustically detectable object arranged in the environment of the marker in the real scene;

ascertaining a positioning rule for representing the virtual image with reference to the reproduction of the object portion as well as to the starting position of playing the audio data using the object data and the virtual image and sound data.

In general, the image and audio data may consist of real three-dimensional or a series of two-dimensional image and sound data, the object data may consist of real object data, and the object portion may consist of a real object portion.

According to an embodiment, in the step of ascertaining, the positioning rule may be ascertained using the marker data or at least part of the marker data. The optical and acoustic reproduction of the real scene can be tracked in the real scene with a definition of further anchor points and/or anchor lines performed in a defined time sequence, even if the actual marker can no longer be detected by the environment sensor of the mobile device.

According to an embodiment, continuous iteration of the steps of reading, determining and ascertaining may be performed in short time intervals, in particular several times per second. For example, the steps may be executed between 10 times and 200 times per second (i.e. every tenth of a second or every 5/1000 second).

The approach described enables the positioning of the virtual optical/acoustic object in an illustration with correct perspective from a great distance and relatively unlimited position of the mobile device. Advantageously it is no longer necessary for the mobile device to recognize the marker and to position the associated virtual object in a fixed position with respect to this marker, but rather in a fixed position with respect to these further anchor points/lines. A great distance may be a distance between ten times and five thousand times the side length of the marker, for example the QR code. According to an embodiment, the range between ten times and five hundred times the side length of the marker is preferred. With a side length of 2 cm of the marker, this corresponds to a distance of up to 100 m (5000× side length). The relatively unlimited position may mean deviations between 0.1° to 180° in all three axes. Thus, 360° all around shall be covered. It is also not necessary for the marker to be in the field of view (environment sensor) of the mobile device at all times.

According to an embodiment, the approach described utilizes the measuring devices arranged in the mobile device—in addition to the image capture—for measuring the change in the relative position—after the detection of the marker—with respect to the position fixed when first detecting the marker. In addition, data of a real object from the real image and sound data are used as object portion, also referred to as a "secondary marker", so that the actual marker no longer needs to be in the sensing range of the environment sensor.

The devices mentioned in the following may be used—after the one-time detection of the marker—as corresponding measuring devices, also referred to as recognition devices or measuring sensors, in the mobile device, for example in the smartphone or tablet, in order to determine a deviation from the first position. Individual measuring sensors also any combinations selected here.

Acceleration sensor: for measuring translatory motion of the mobile device one hand, for determining the direction of Earth's gravity relative to the device and thus orientation/rotation of the device on the other hand.

Rotational sensor: for measuring rotational motion of the mobile device.

Magnetometer: for measuring Earth's magnetic field and thus horizontal rotation of the mobile device.

GPS receiver: optional with very great distances and for positioning at accuracy of ±2 meters.

Microphone: for detecting and measuring individual sound sources or general background noise. Frequencies in the audible range (20-20000 Hz) are preferred here, but frequencies in the ultrasound range may also be used.

The use of acceleration sensor and rotational sensor as an addition to the image sensor is preferred here.

The image sensor may be limited to visible light (400-800 nm), but may also additionally or exclusively sends other spectral ranges (e.g. additionally or also exclusively IR or UV light).

For example, measured values of a corresponding measuring device may be used to determine a shift of the object portion or of the reproduction of the object portion caused by motion of the mobile device. According to an embodiment, a value representing the shift is used to ascertain the positioning rule for positioning the virtual image and audio data with respect to the reproduction of the object portion in the step of ascertaining.

Hence, the positioning rule may, for example, be ascertained using a measured value of a measuring device or several measuring devices, for example an acceleration sensor, a rotational sensor, a magnetometer or a GPS receiver, of the mobile device.

This further solves a technical problem occurring when the virtual object is to move in reality. If the marker disappears from the field of view of the environment sensor when tracking this motion, the virtual illustration does not crash. Thus, image sequences in a wide environment region may now be represented.

Additionally, audio data for more realistic representation of the virtual object may now be played at various, freely chosen positions.

According to an embodiment, the method comprises a step of providing at least part of the marker data to an interface to an external device. In this case, in the step of reading virtual three-dimensional or selected two-dimensional or a series of these image and audio data, the virtual image and audio data may be read via the interface to the external device, for example a server. The interface mentioned may, for example, be a radio interface. Advantageously, the selection of the virtual image and audio data may be performed using the external device. Thereby, memory space on the mobile device may be saved, and it may be ensured that up-to-date virtual image and audio data are available at all times.

The method may comprise a step of selecting the virtual image and audio data from the plurality of virtual image and audio data using the marker data. The step of selecting may be performed using an external device or a device of the mobile device. The latter option offers the advantage that the method may be executed autarkically on the mobile device. The virtual image and audio data may be selected by comparing the reproduction of the marker or an identification of the marker with reproductions or identifications of potential markers associated with the plurality of virtual images, for example, and selecting that one of the virtual images for which there is a match. In this way, the matching virtual image and audio data may be selected with great reliability.

To this end, the method may comprise a step of ascertaining an identification of the marker using the marker data. In the step of selecting, the virtual image and audio data may then be selected using the identification. An identification may for example be a code or a character string.

For example, the marker may represent a machine-readable code comprising a corresponding identification of the marker. In this case, the identification of the marker may be determined as part of the marker data in the step of determining marker data. By using a machine-readable code, the reproduction of the marker may be evaluated very easily.

The method may comprise a step of using the positioning rule to overlay another reproduction of the real scene with the virtual image and audio data. Advantageously, the positioning rule, once determined, may be used to overlay temporally successive reproductions of the real scene with the virtual image and audio data.

To this end, the step of using may, for example, comprise a step of reading further reproduction data which represent the further reproduction of the real scene captured by the environment sensor of the mobile device, a step of determining a positioning of the further reproduction of the object portion from the further reproduction data—which are present either as three-dimensional points in a coordinate system or as a point and vectors or as a selection of two-dimensional photographs, and a step of creating overlaid image and audio data using the further reproduction data, the further reproduction of the object portion and the positioning rule, wherein the overlaid image and audio data represent an overlay of the further reproduction of the real scene with the virtual image and audio data. In the step of determining the positioning, the positioning of the further reproduction of the object portion within the further reproduction of the real scene may be determined. Thus, optical and acoustic reproductions of the object portion in temporally and spatially fitting reproductions of the real scene may be employed as anchor points for the virtual image and audio data. In the step of creating overlaid image and audio data, the virtual image and audio data may be represented using the representation instruction.

The method may comprise a step of displaying an overlay of the further reproduction of the real scene with the virtual image and audio data using a display and replay device of the mobile device. To this end, for example, the overlaid image and audio data already mentioned may be provided to the display and replay devices. The display device may be a screen or a display, the replay device may be a loudspeaker or an interface for stereo replay.

The method may comprise a step of capturing the image data and optionally the audio data using the at least one environment sensor of the mobile device. For example, image and audio data may be captured temporally continuously so that reproductions of the real scene may be provided in a temporally continuous manner. The virtual image and audio data may be superimposed in the individual reproductions of the real scene.

According to various embodiments, also multiple virtual three-dimensional objects or two-dimensional images and audio data may be used for the overlay. In this case, in the step of reading, multiple virtual image and audio data may be read, or the virtual image and audio data may comprise representation instructions and positioning instructions for representing and positioning the plurality of virtual images and audio data.

Also, multiple object portions of one or different objects may be used. In this case, in the step of determining the object data, multiple object data may be determined, or the object data may represent reproductions and positionings of the plurality of object portions. Correspondingly, in the step of ascertaining the positioning rule, multiple positioning rules for positioning the virtual image with respect to individual object portions may be ascertained. As an alternative, a positioning rule suitable for positioning the virtual image and audio data with respect to the reproductions of the plurality of object portions may be ascertained. The use of a plurality of object portions offers the advantage that the virtual image and audio data can be positioned very accurately and can be positioned even when not all object portions used are depicted in a reproduction of the real scene.

The approach presented here further provides an apparatus configured to perform, control or implement the steps of a variant of a method presented here in corresponding devices. The object underlying the disclosure may be achieved quickly and efficiently also by way of this embodiment of the disclosure in the form of an apparatus.

The apparatus may be configured to read input signals and to determine and provide output signals using the input signals. For example, an input signal may represent a sensor signal readable via an input interface of the apparatus. An output signal may represent a control signal or a data signal which can be provided at an output interface of the apparatus. The apparatus may be configured to determine the output signals using a processing rule implemented in hardware or in software. For example, the apparatus may comprise a logic circuit, an integrated circuit or a software module and may, for example, be realized as a discrete component or be included in a discrete component.

What is also advantageous is a computer program product having program code which may be stored on a machine-readable carrier, such as semiconductor memory, hard disk or optical memory, and is used for performing the method one of the previously described embodiments, when the program product is executed on a computer or an apparatus.

BRIEF DESCRIPTION OF THE DRAWINGS

Embodiments of the disclosure are illustrated in the drawings and explained in greater detail in the subsequent description. In the figures.

DETAILED DESCRIPTION

Figure 1:
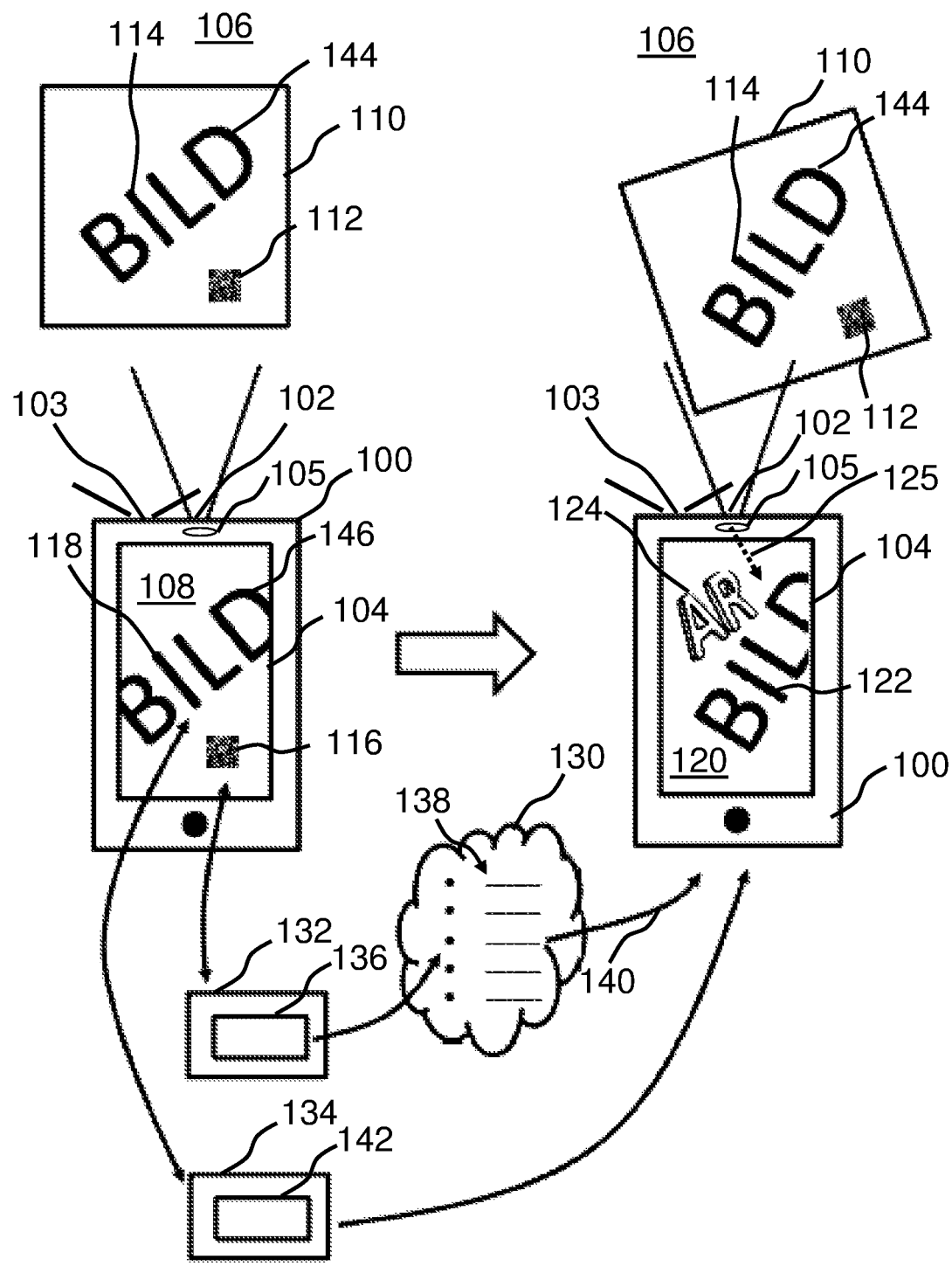
FIG. 1 shows an overview illustration of a method of overlaying a reproduction of a real scene with virtual image and audio data, according to an embodiment.

FIG. 1 shows an overview illustration of a method of overlaying a reproduction of a real scene with virtual image and audio data, according to an embodiment according to an embodiment.

The left half of FIG. 1 shows a mobile device 100, for example a smartphone, comprising an environment sensor 102, a further environment sensor 103, a display device 104 and a replay device 105. According to this embodiment, the environment sensors 102 and 103 are a camera and a microphone configured to capture a real scene 106, also referred to as real environment, in a sensing range of the environment sensors 102, 103. According to this embodiment, the display devices 104 and 105 are a display device and a loudspeaker configured to display a reproduction 108 of the real scene 106 captured by the environment sensors 102, 103 to an operator.

According to this embodiment, an object 110 on the outer surface of which there is a marker 112 is arranged in the real scene 106. For example, the object 110 may be any image or an item. The object 110 and the marker 112 are arranged partially and completely in the sensing range of the environment sensors 102, 103, respectively. In particular, at least one object portion 114 of the object 110 is arranged in the sensing range of the environment sensors 102 103. Thus, the reproduction 108 comprises a reproduction 116 of the marker 112 and at least one reproduction 118 of the object portion 114.

The right half of FIG. 1 shows the mobile device 100 at a temporally subsequent point of time as compared to the illustration in the left half. Due to interim motion of the mobile device 100, the real scene 106 has changed slightly as viewed from the environment sensors 102, 103, so that a further reproduction 120 slightly changed with respect to the reproduction 116 is displayed by the display 104. For example, the further reproduction 120 may depict the real scene 106 in another perspective, also sound perspective, as compared to the reproduction 108 or another section of the real scene 106. For example, the other section is such that the further reproduction 120 comprises a further reproduction 122 of the object portion 114, but no further reproduction of the marker 112. Nevertheless, the further reproduction 120 may be overlaid with virtual image and audio data 124, 125 by using the described method. According to an embodiment, the further reproduction 120 is to be overlaid with the virtual image and audio data 124, 125 in a predetermined position and/or predetermined orientation. According to an embodiment, such a predetermined overlay is possible as long as the further reproduction 120 comprises a suitable further reproduction 122 of the object portion 106 which can be used as an anchor point for the virtual image and audio data 124, 125.

The steps of the method may be executed exclusively using devices of the mobile device 100 or additionally using at least one external device, exemplarily illustrated here as cloud. For example, the external device 130 may be coupled online to the mobile device 100.

According to an embodiment, the virtual image and audio data 124, 125 are generated only using data detected by the environment sensor 102, i.e. no real audio data is used.

The method may be executed continuously or may be launched with a content call or a view of the real scene 106 using the display devices 104 requested by the operator.

The reproduction 108 is based on image and audio data provided by the environment sensors 102, 103 or an evaluation device downstream of the environment sensors 102, 103. Marker data 132 and object data 134 are determined from the image and audio data, schematically illustrated here, for example using an object recognition method or another suitable image and sound processing method. The marker data 132 are determined from the image and audio data by way of a suitable extraction and comprise identification data 136 associated with the marker 112, for example an identification ID associated with the marker 112 and/or an at rest or a pointer associated with the marker 112, for example in the form of a URL. The marker data 132 or parts of the marker data 132 or data determined therefrom, such as the identification associated with the marker, may be used to select virtual image and audio data 140 associated with the marker 112 from the plurality of virtual image and audio data using an association rule 138, for example an allocation table, which is stored in a memory of the external device 130, according to this embodiment. The plurality of virtual image and audio data may be stored in the allocation table 138 in the form of AR content. The virtual image and audio data 140 are transmitted to the mobile device 100 and used for displaying and additionally or alternatively replaying the virtual image 124. According to an embodiment, selecting the virtual image and audio data 140 is executed only when a new marker 112 is found, for example when the reproduction 116 of the marker 112 or the identification data 136 of the marker 112 was first extracted from the image and audio data representing the reproduction 108.

The object data 134 are determined from the image and audio data by way of a suitable extraction of suitable image and additionally or alternatively sound features. The suitable image/sound features are used for creating a positioning rule 142, also referred to as a new AR marker, for example for temporary and local use. The positioning rule 142 is used by the mobile device 100 so as to be able to represent the virtual image and audio data 124 as an overlay of the reproduction 106 or of the further reproduction 120 even when no reproduction 116 of the marker 112 is available. No online matching is necessary for using the positioning rule 142. According to this embodiment, the positioning rule 142 refers to the object portion 114, which represents a natural marker.

According to an embodiment, reliable association of the AR content on the basis of a URL and stable 3-D tracking on the basis of a new, and hence up-to-date, natural marker are enabled.

According to an embodiment, at least two natural markers, i.e. for example the object portion 114 and another object portion 144 of the object 110, are used so as to be able to position the virtual image and audio data 124, 125 in the further reproduction 120. In this case, the positioning rule 142 relates to both object portions 114, 144 or their reproductions 118, 122, 146. In the embodiment shown in FIG. 1, the further object portion 144 is not depicted in the further reproduction 120 of the real scene 106. Nevertheless, the virtual image and audio data 124, 125 can be positioned by way of the further reproduction 122 of the object portion 114.

According to an embodiment, the approach described is based on a combination of two methods by which three-dimensional positions of objects can be extracted from camera images.

In the first one of these methods, predefined geometrical shapes are used as marker 112, which are placed in the region of the camera reproduction, e.g. QR codes. Based on the known shape of such a marker 112 and its reproduction 116 in the camera reproduction 108, its three-dimensional orientation in space can be determined by way of image processing. Advantages of the first method are that, due to predefined design rules of the marker 112, it can unambiguously be identified in the camera reproduction 108, and that also additional information may thus be encoded directly in the appearance of the marker 112, such as the ID of a marker 112 or a web link via QR code. In this way, by an encoding scheme defined once, e.g. black and white bits of the QR code, a very great number of different markers can unambiguously be distinguished from each other optically. However, it is a disadvantage that these markers 112 hardly are robust against small disturbances in the camera reproduction 108 due to the necessarily exactly defined shape. Such small disturbances may be e.g. a slight focus blur, motion blur or a steep viewing angle. This leads to the fact that the three-dimensional location of one of these markers 112 can only be extracted correctly if it is completely focused, parallel to the image plane and can be seen unhidden in the camera reproduction 108, and the camera 102 is almost stationary relative to the marker 112. Hence, e.g. the continuous AR superposition of a virtual 3-D object 124 in correct position on the basis of a marker 112 in the form of a QR code becomes almost impossible. In case of a large design of a geometrical marker 112, this problem is somewhat moderated, but accompanied by another disadvantage in that such marker then is to be placed in the scene 106 in a prominent and large manner, which is unsuitable for most applications.

In the second one of these methods, which may also be referred to as Natural Feature Tracking or NFT, reproductions of objects 110, e.g. the cover image of a flyer, in the real environment 106 previously are defined as markers, and natural optical features 114 thereof, e.g. distinctive points, edge courses or colors, first are extracted from the original in a suitable form by an algorithm, i.e. quasi learned. The camera reproduction 108 then is searched for these previously learned natural features 114 for AR position determination, i.e. for determining the position of a virtual image 124 to be overlaid, and by optimization methods it is decided if the object 110 sought currently is in the camera reproduction 108 and also its orientation and position is estimated on the basis of the arrangement of its individual features 114. The advantage here is that there is great robustness to disturbances due to the optimization-based method. Thus, positions of marker objects 114 can be recognized even in blurred camera reproductions 108, 120, when partially hidden and at very steep angles. Further methods (e.g. SLAM) even allow for continuously expanding, on the basis of an initial recognition of a marker object 114 in the camera reproduction 108, 120, its model with features from the current environment so that its orientation in space may partly be determined correctly even if it cannot be seen in the camera reproduction 120 anymore itself. However, this method has significant disadvantages, in particular when a great number of different markers is to be recognized therewith. At first three marker object 114 is to satisfy certain optical criteria with respect to the natural optical appearance so as to be recognizable in the camera reproduction 108, 120 at all. Moreover, for unambiguous identification, all recognizable markers 114 must clearly differ from each other—the greater the number of recognizable markers 114, the higher the likelihood of misallocation. This is particularly problematic if many optically similar objects 100, e.g. business cards, within a database are to be distinguished. Furthermore, a database with the natural features of all recognizable markers must already exist at the time of recognition, and this complete database must be compared with the camera reproduction 108, 120 to find out if one of the markers 114 is in the camera reproduction. In the case of a system such as a smart phone AR app with a continuously growing marker database, this requires providing the current version of the database at a central location (online), with each smartphone 100 having to send a computationally extensive reproduction search request to this database for analyzing every single camera reproduction 108, 120.

According to an embodiment, the approach described here is based on a combination of the two methods above, wherein both methods are performed in successive, linked stages for recognition and 3-D positioning of marker objects in the camera reproduction 108, 120: In the first stage, a geometrical, predefined marker design, e.g. QR code or a barcode, is used as reproduction 116 of the marker 112 in the camera image 108 purely for identifying virtual image and audio data 140 of a virtual image 124, referred to as AR content 124 here. For example, the reproduction 116 of the marker 112 may take up only 0.6% or even only 0.1% or even 0.01% of the reproduction 108 of the real scene 106. This corresponds to 0.5 cm side length of the reproduction 116 of the marker 112 on a DINA4 size sheet.

The recognition of a marker 112 in form of a QR code in the respective camera image examined will be explained in detail later on the basis of FIG. 5.

According to an embodiment, the inclusion of the microphone 103 and additionally or alternatively the loudspeaker 105, or the inclusion of several microphones and/or several loudspeakers of the smart phone 100, if present, takes place. In this respect, the selection of the virtual data 140 takes place depending on the detection of a primary marker 116 (QR codes/barcodes) by the camera 102 of the smart phone 100. The selected virtual data 140, however, do not only consist of image data but also of sound data which are played depending on the further movement of the virtual object 124 superposed into the real scene.

For easier understanding: a three-dimensional television film (captured by a series of cameras from 360°—for example 36 cameras at 10° distance each also 72 cameras at 5° distance each) taking place in the free space of a living room. Of course, the virtual image and sound objects 140 are represented in correct perspective each even if the smart phone 100 moves around the scene, i.e. secondary markers 122 are used. It is desirable for correct representation of the sound objects, in particular, to play the audio data via stereo headphones. Such stereo headphones may be connected to the smart phone 100 via a suitable interface. In another variant, these secondary markers 122 do not only include image features but also sound features of the real scene. For example, this includes singular sound sources of specific tones or also the specific arrangement of musical instruments.

Figure 2:
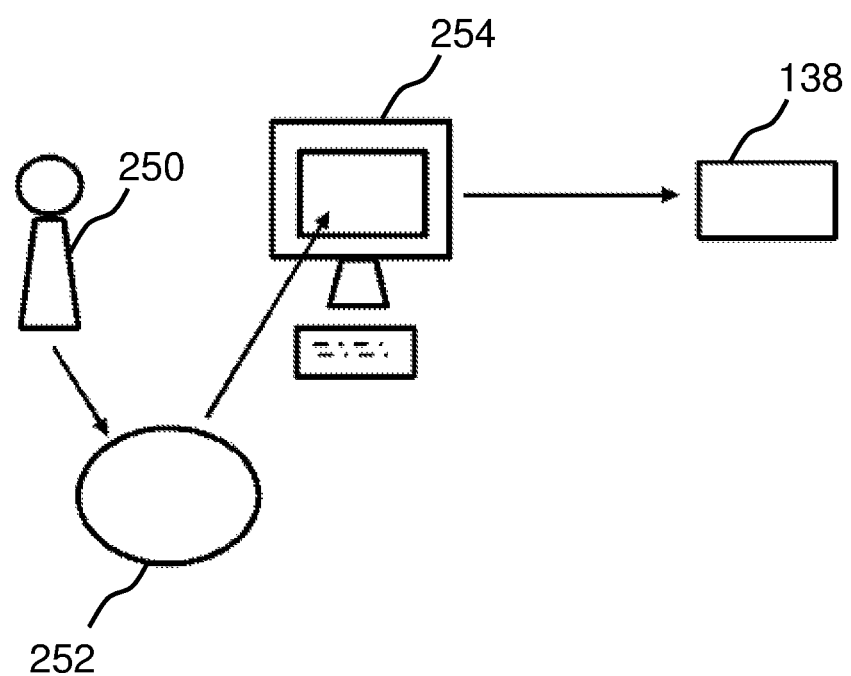
FIG. 2 shows an overview illustration of a method of creating an association rule, according to an embodiment.

FIG. 2 shows an overview illustration of a method of creating association rule 138, according to an embodiment. The association rule 138 may be stored in the external device shown in FIG. 1, for example.

An operator 250 provides 3D AR contents 252, for example in the form of a plurality of virtual image and audio data. A web interface 254 is used to create or update the association rule 138 based on the 3D AR contents 252. According to an embodiment, the association rule 138 comprises a link to a specific, unique URL for each 3D AR content 252 of the 3D AR contents 252.

Figure 3:
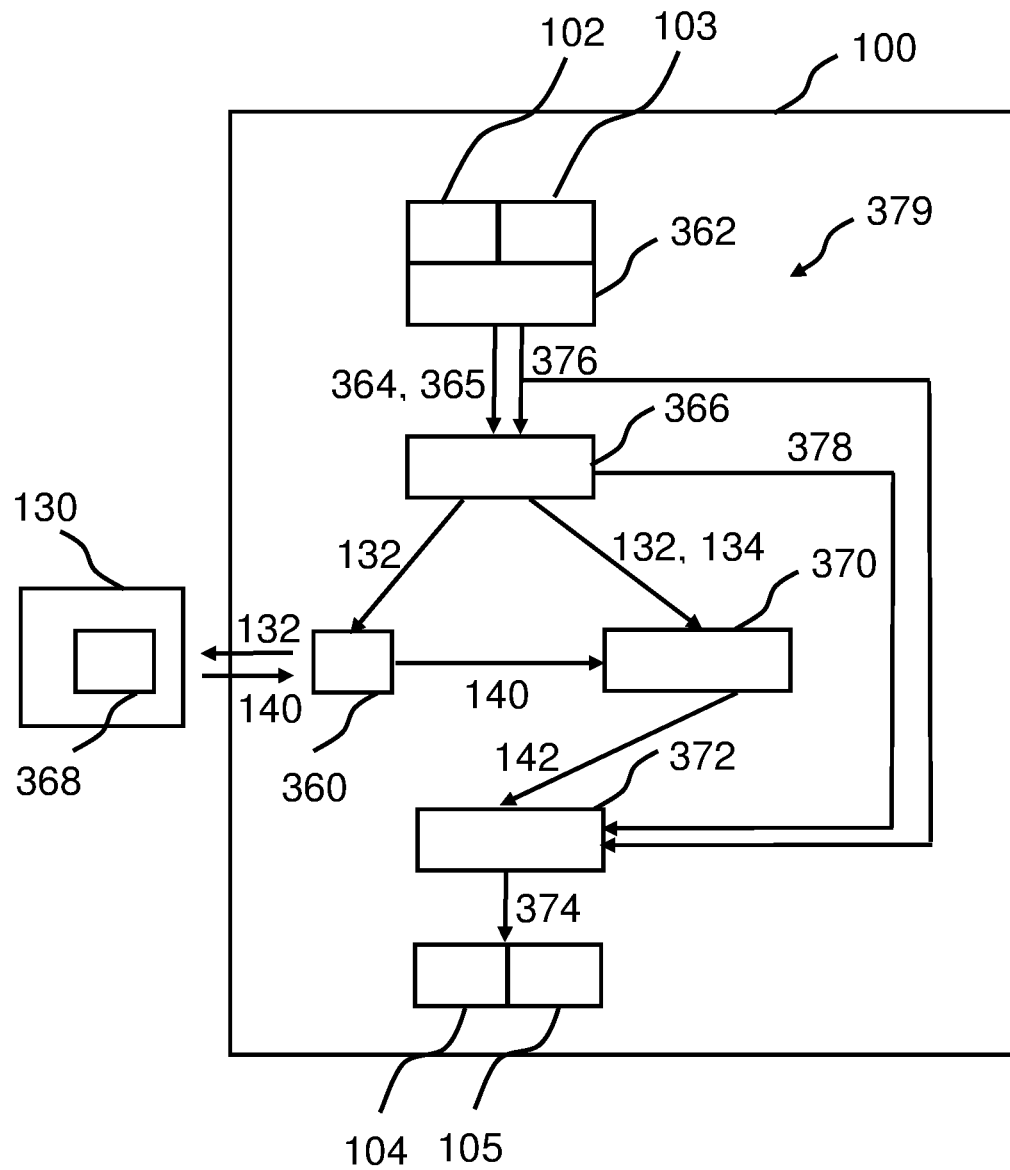
FIG. 3 shows a schematic illustration of a mobile device, according to an embodiment.

FIG. 3 shows a schematic illustration of a mobile device 100, according to an embodiment. The mobile device 100 may be the mobile device shown in FIG. 1, for example. The mobile device 100 comprises environment sensor 102, 103 and display devices 104, 105 for displaying a reproduction of a real scene captured by the environment sensor 102. The reproduction may be overlaid with virtual image and audio data. According to this embodiment, the mobile device 100 comprises an interface 360, for example interface for wireless data transmission, to an external device 130. According to an embodiment, the environment sensor 102 and the display 104 are arranged on a back side and a front side of the mobile device 100, respectively.

The mobile device 100 comprises a reader 362 coupled to the environment sensors 102, 103 and configured to read image and audio data 364, 365 of the environment sensors 102, 103 as raw data or already preprocessed data. For example, the reader 362 is an interface to the environment sensors 102, 103. The image and audio data 364, 365 represent a reproduction of the real scene captured by the environment sensors 102, 103. The image and audio data 364, 365 read by the reader 362 are processed further in a determiner 366 of the mobile device 100. In particular, marker data 132 and object data 134 are determined, for example extracted, from the image data 364 and optionally from the audio data 365. The marker data 132 represent a reproduction and a positioning of a marker arranged in the real scene, for example of the geometrical marker 112 shown in FIG. 1. The object data 134 represent a reproduction and a positioning of object portion of an object arranged in the surrounding of the marker in the real scene. For example, the object portion may be the object portion 114 shown in FIG. 1, which may be used as a natural marker. To this end, the determiner 366 is configured to first recognize the reproduction of the marker in the reproduction of the real scene and then determine the marker data associated with the reproduction of the marker from the image and audio data 364, 365. Correspondingly, the determiner 366 is configured to first recognize one or more suitable reproductions of object portion is in the reproduction of the real scene and then determine the object data associated with the reproduction or reproductions of the suitable object portion is from the image and audio data 364, 365. According to an embodiment, only the image data 364 and not the audio data 365 are used for this.

According to this embodiment, the marker data 132 are provided to the external interface 360 and transmitted to the external device 130, for example in the form of an external appliance, via the external interface 360, for example a radio interface. The external device 130 comprises a selector 368 configured to select virtual image and audio data 140 associated with the marker data 132 from a plurality of virtual image and audio data using an association rule and provide the same to the external interface 360 of the mobile device 100. As an alternative, only parts of the image and audio data 132 or the image and audio data 132 in a further processed form may be provided to the reader 360 and/or the external device 130. The external interface 360 is configured to provide the virtual image and audio data 140 to a determiner 370. The virtual image and audio data 140 comprise a representation instruction for representing a virtual image and a positioning instruction for positioning the virtual image or the reproduction of an object as well as an instruction for the replay positioning of the virtual audio data. The determiner 370 further is configured to receive the marker data 132 and the object data 134. The determiner 370 is configured to determine a positioning rule 142 for positioning the virtual image with respect to the reproduction of the object portion using the marker data 132, the object data 134 and the virtual image and audio data 140.

According to this embodiment, the mobile device 100 comprises a controller 372 for controlling the display device 104. The controller 372 is configured to provide overlaid image and audio data 376 to the display 104, for example in the form of a control signal for controlling a display shown by the display device 104, 105. The overlaid image and audio data 376 here represent an overlay of a further reproduction of the real scene with the virtual image and audio data. The controller 372 is configured to create the overlaid image and audio data 376 using the positioning rule 142 provided by the determiner 370, further image and audio data 376 and further object data 378. The further image and audio data 376 represent a further reproduction of the real scene captured by the environment sensors 102, 103. The further object data 378 comprise at least a positioning of the object portion within the further reproduction of the real scene.

According to an embodiment, the positioning rule 142 comprises the representation instruction for representing the virtual image comprised by the virtual image and audio data 140. As an alternative, the representation instruction may be transmitted to the controller 372 separately from the positioning rule 142.

According to an embodiment, the selector 368 is part of the mobile device 100. In this case, the external device 130 is not required, and the external interface 360 may be realized as an internal interface.

The devices 360, 362, 366, 370, 372 shown in FIG. 3 are only an exemplary arrangement of devices of an apparatus 379 for overlaying a reproduction of a real scene with virtual image and audio data. For example, some or all of the devices 360, 362, 366, 370, 372 may be combined to form larger units for implementing the method steps of a method of overlaying a reproduction of a real scene with virtual image and audio data.

Figure 4:
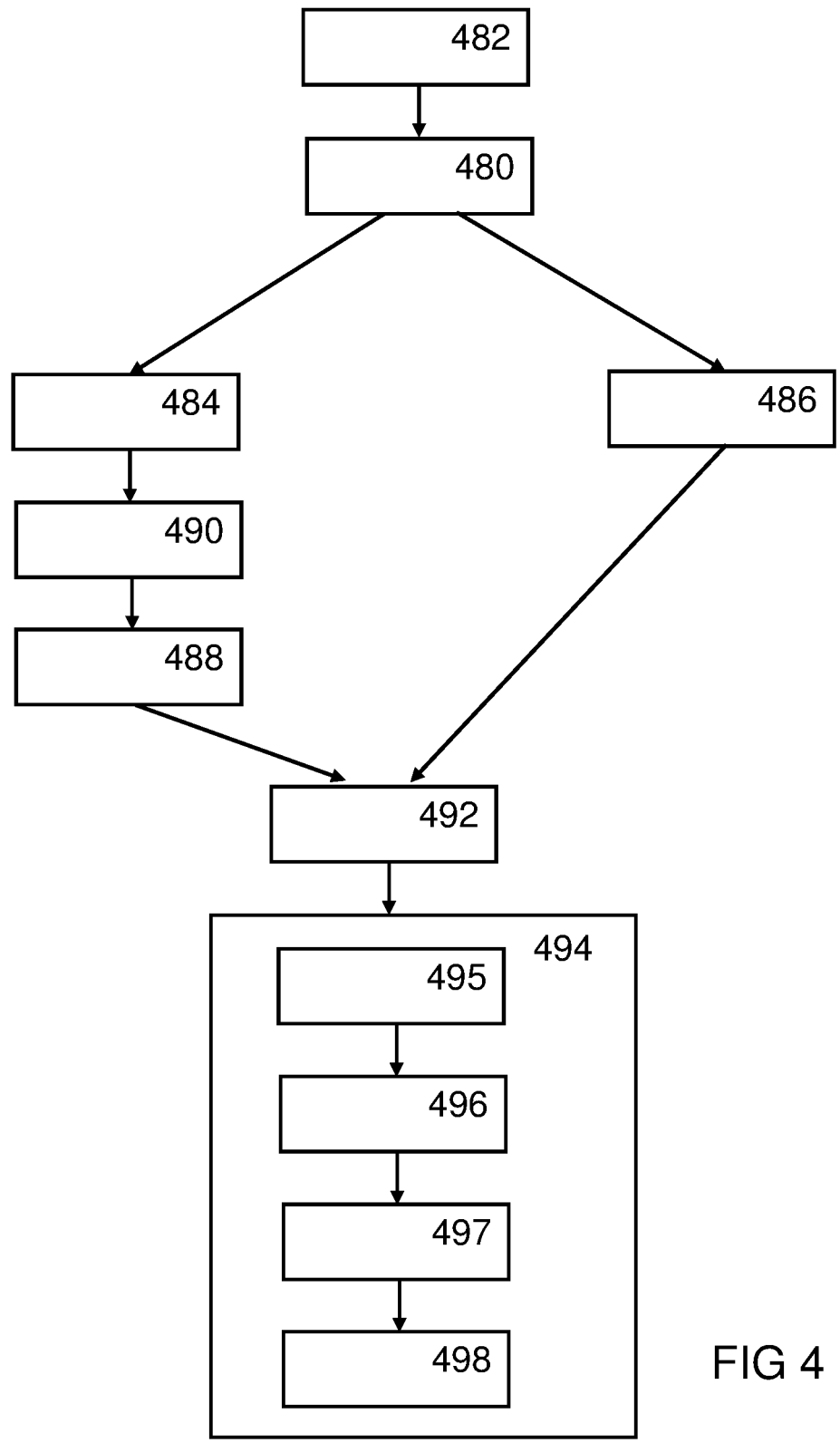
FIG. 4 shows a flowchart of a method of overlaying a reproduction of a real scene with virtual image and audio data, according to an embodiment.

FIG. 4 shows a flowchart of a method of overlaying a reproduction of a real scene with virtual image and audio data, according to an embodiment. The method may be executed using devices of a mobile device described on the basis of the preceding figures.

In a step 480, image and audio data representing a reproduction of a real scene captured by environment sensors of the mobile device are read. The image and audio data may have been captured by the environment sensors in an optional preceding step 482. In a step 484, marker data representing a reproduction and a positioning of a marker arranged in the real scene are determined from the image and audio data. Correspondingly, in a step 486, object data representing a reproduction and a positioning of an object portion of an object arranged in an environment of the marker in the real scene are determined from the image and audio data. In a step 488, virtual image and audio data representing image and audio data selected from a plurality of virtual image and audio data using the marker data and comprising a representation instruction for representing the virtual image and a positioning instruction for positioning the virtual image as well as for playing the audio data are read. In an optional step 490, which may be executed on the mobile device or an external device, the virtual image and audio data are selected using the marker data. In a step 492, a positioning rule suitable for representing the virtual image and audio data with respect to the reproduction of the object portion is ascertained using the marker data, the object data and the virtual image and audio data, for example as an overlay of a further reproduction of the real scene.

In an optional step 494, the positioning rule is used to represent the overlay of the further reproduction of the real scene with the virtual image and audio data, for example on the display and replay device of the mobile device.

For example, the step 494 may comprise a step 496 of reading further image and audio data representing the further reproduction of the real scene, a step 498 of determining a positioning of a further reproduction of the object portion from the further image and audio data, and a step of creating 499 overlaid image and audio data using the further image and audio data, the further reproduction of the object portion and the positioning rule, wherein the overlaid image and audio data represent an overlay of the further reproduction of the real scene with the virtual image and audio data. In the step of determining the positioning, the positioning of the further optical and acoustic reproduction of the object portion within the further reproduction of the real scene can be determined. Thus, reproductions of the object portion in temporally successive reproductions of the real scene may be employed as anchor points for the virtual image and audio data. In the step of creating overlaid image and audio data, the virtual image and audio data may be represented using the representation instruction.

The step 494 may be repeated continuously, wherein the positioning rule is used to continuously overlay further reproductions of the real scene with the virtual image and audio data. The preceding steps need not be executed repeatedly, because it is sufficient to determine the positioning rule once.

According to an embodiment, in the step 486, object data representing reproductions and positionings of several object portion is, for example two, three, four or more object portions, of one or more objects associated in the environment of the marker in the real scene are determined from the image and audio data. In this way, the number of anchor points for anchoring the virtual image in the further reproduction or the further reproductions of the real scene may be increased. In this case, in the step 492, the positioning rule can be ascertained so that it is suitable for representing the virtual image and audio data in the further reproductions of the real scene with respect to the optical and acoustic reproductions of the object portions. So as to implement this representation, the positionings of the individual reproductions of the object portions are determined from the further image and audio data in the step 498 of determining. Advantageously, in this case, the virtual image and audio data may still be positioned in accordance with the requirement deposited in the virtual image and audio data even if not all reproductions of the object portions are comprised by the further image and audio data.

According to an embodiment, in the step 492, the positioning rule is ascertained using a measured value of a measuring device, in particular an acceleration sensor, a rotational sensor, a magnetometer, a GPS receiver or one or more microphones of the mobile device.

Figure 5:
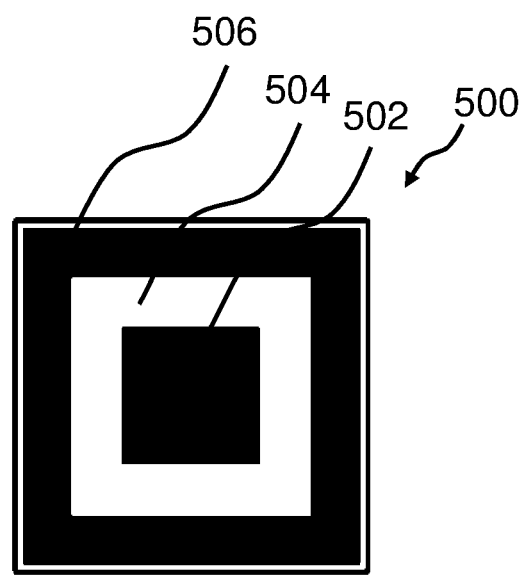
FIG. 5 shows a QR code placement square with binary contours according to an embodiment.

FIG. 5 shows a QR code placement square 500 with binary contours, according to an embodiment, wherein a QR code is employed as a marker.

In order to recognize the QR code, at first a binarization, which converts all pixels of the image to mere black and white values, of the respective camera image being examined is performed. Then, contours, i.e. straight-line boundaries between black and white pixels, are searched in the resulting image and filtered in a manner corresponding to the visual properties of the three placement squares of a QR code. There is a closed black contour 502 within a closed white contour 504 in turn within a closed black contour 506.

Once the three placement squares 502, 504, 506 of the QR code are found, the pixels between these are read, and a bit sequence, which in turn is converted to a character string or URL, is determined in a manner corresponding to the distribution of black and white pixels with a predetermined coding.

In the next step, the position and location of the QR code in relation to the camera is determined. For example, the perspective n point method "RANSAC", as known from literature, is used to this end. Substantially, given corresponding calibration, the camera is approximated by a simple pinhole camera model, so that the mapping of 3-D points in the real environment of the camera to their corresponding points in the 2-D camera image can be described by way of a linear system of equations. This system of equations is filled with the points of the three QR code placement squares in the camera image and extended by the known side conditions of the location of the squares with respect to each other so as to be able to be solved through linear optimization.

In the following, partly reference numerals employed with reference to FIG. 1 will be used to further describe the method:

At the same time, for example exactly in the moment of recognition of the marker 112, for example in the form of a code, the current environment directly around the marker 112 is captured in the camera image 108, natural features 114 are extracted therefrom, and a new natural marker 118 is created therewith in real-time in accordance with the second method. For example, the "SURF" (Speeded Up Robust Features) method, which is known from literature, stores features in a transformation-invariant manner in two-dimensional objects and may recognize them in subsequent images, is used to this end. The entirety of the features identified by SURF at the time of creation as well as their positioning with respect to each other are stored as an associated "marker". In addition, the previously computed position of the QR code within this image is stored in relation to this newly created marker.

In all subsequent camera images 120 and movements of camera 102 or marker 114, the three-dimensional position determination of the AR content 124 may now be effected on the basis of the new, robust natural marker 114.

To this end, the SURF algorithm is again employed in each following camera image, and the features found therein are compared to the previously stored features. In case of a sufficient match, the previously stored marker linked to the initial QR code is considered to be recognised in the subsequent image. Furthermore, its position may be determined again on the basis of a perspective n point method (see above).

For representing the augmented reality, for example, the ascertained data on position and location of the QR code are used to correspondingly transform the representation of virtual objects, which are present as a 3-D CAD model, for example, and then compute a 2-D representation of these objects by a virtual camera. In the last step, the transformed 2-D view of the virtual object is superimposed onto the real camera image, which, in the composed image, gives the impression of the virtual object being directly on the QR code in the camera image of the real environment.

With growing distance or rotation of the camera with respect to the originally identified QR code, the above positioning method can be repeated as often as necessary to continuously create new "markers" in the real environment and store them together with their relative positions to the QR code. This continuous iteration is known as "SLAM" (Simultaneous Location and Mapping) in literature. Depending on the scene to be expected (e.g. predominantly surfaces or uneven structures, shiny or rough materials, still or moving images), several other feature descriptors can be used apart from the SURF method mentioned, to unambiguously recognize features in a manner invariant with respect to disturbance.

Hence, a continuously stable representation and movement and acoustically correct representation of three-dimensional virtual objects as virtual images 124 is possible, or they can be tracked even if they are only placed in the real scene 106 in a small and unobtrusive manner, in contrast to geometrical markers.

Furthermore, the optical distinctiveness of the newly created marker 114 is completely irrelevant as compared with other markers, because its association with AR content 124 was already fixed by the linked code, i.e. the marker 112. By way of directly extracting a URL from the linked code, it can also be avoided to continuously search and online feature database, and the number of distinguishable markers within an application is increased to almost infinity. Furthermore, by way of creating the natural AR marker 114 immediately at the time of use, in contrast to previous AR methods, even objects 100 frequently changing their optical appearance, e.g. fronts of houses at different times of day or times of year, can be used as natural markers 114.

The augmented reality superposition of objects for which there are no 3-D CAD data, but only photographs from different perspectives represents an extension. In particular, there is the problem that transformation of the virtual object cannot be performed without the 3-D CAD data, and a virtual 2-D image thereof which gives the impression of the positioning of the virtual object in the real environment with correct location cannot be computed by conventional methods. As a solution for the problem, what is presented here is a method giving this impression solely on the basis of previously captured photos of an object with a viewing angle of the capturing camera to the object as known at the time of capture. To this end, the above-described position and location of the QR code relative to the camera are used: At first, the image whose viewing angle at the time of capture best corresponds to the viewing angle of the augmented reality camera relative to the QR code is selected from the available images of the object. Optionally, a new image corresponding to the viewing angle in an even better way is interpolated from several images. This image now is scaled corresponding to the distance of the QR code to the augmented reality camera and positioned corresponding to the position of the QR code in the camera image so that the composition of both images continuously gives the impression of the previously photographed object being present in the environment later viewed with the augmented reality camera.

The invention claimed is:

1. A method of overlaying an optical and acoustic reproduction of a real scene with virtual three-dimensional or two-dimensional image and audio data, the method comprising the following steps:
   reading reproduction data, wherein the reproduction data represent at least image data which represent an image reproduction of the real scene captured by at least one environment sensor of a mobile device;
   determining marker data from the image data, wherein the marker data represent a reproduction and a positioning of a marker arranged in the real scene;
   reading virtual image and audio data which represent image and audio data selected from a plurality of virtual image and audio data using the marker data, wherein the virtual image and audio data comprise a representation instruction for representing a three-dimensional defined object and/or a selection of captures of an object captured from various angles as a virtual reproduction, a positioning instruction for positioning the virtual reproduction and a positioning instruction for replay of acoustic data;
   determining object data from the reproduction data, wherein the object data consist of a three-dimensional reproduction or a series of two-dimensional photographs and/or audio recordings from various angles and a positioning of object portion of an object arranged in the environment of the marker in the real scene; and
   ascertaining a positioning rule for representing the virtual reproduction and the acoustic data with reference to the reproduction of the object portion using the object data and the virtual image and audio data;
   wherein the reproduction of the marker takes up less than 1% of the reproduction of the real scene.

2. The method according to claim 1, wherein in the step of reading the reproduction data further represent audio data which represent an acoustic reproduction of the real scene captured by at least one further environment sensor of the mobile device.

3. The method according to claim 1, wherein the image data and/or the audio data represent real image and audio data, the object data represent real object data, and the object portion represents a real object portion.

4. The method according to claim 1, wherein in the step of ascertaining the positioning rule is ascertained using the marker data or at least part of the marker data.

5. The method according to claim 1, wherein continuous iteration of the steps of reading, of determining and of ascertaining is performed in short time intervals, in particular two or more times per second.

6. The method according to claim 1, wherein in the step of ascertaining the positioning rule is ascertained using a measured value of a measuring device, in particular an acceleration sensor, a rotation sensor, a magnetometer or a GPS receiver, of the mobile device.

7. The method according to claim 1, comprising a step of providing at least part of the marker data to an interface to an external device, wherein in the step of reading virtual image and audio data the virtual image and audio data are read via the interface to the external device.

8. The method according to claim 1, comprising a step of selecting the virtual image and audio data from the plurality of virtual image and audio data using the marker data.

9. The method according to claim 1, wherein the marker represents machine-readable code comprising an identification of the marker, wherein the step of determining marker data the identification of the marker is determined as part of the marker data.

10. The method according to claim 1, comprising a step of using the positioning rule in order to overlay a further optical and acoustic reproduction of the real scene with the virtual image and audio data.

11. The method according to claim 10, wherein the step of using comprises:
- a step of reading further image and audio data wherein the further image and audio data represent the further image of the real scene captured by the environment sensors of the mobile device;
- a step of determining a positioning of a further reproduction of the object portion from the further image and audio data; and
- a step of creating overlaid image and audio data using the further image and audio data, the positioning of the further reproduction of the object portion and the positioning rule, wherein the overlaid image and audio data represent an overlay of the further reproduction of the real scene with the virtual image and audio data.

12. The method according to claim 10, comprising a step of displaying an overlay of the further reproduction of the real scene with the virtual image and audio data using a display device and a replay device of the mobile device.

13. The method according to claim 1, comprising a step of capturing the reproduction data using the at least one environment sensor of the mobile device.

14. An apparatus for overlaying a reproduction of a real scene with virtual image and audio data, wherein the apparatus comprises one or more devices for implementing the steps of the method of claim 1.

15. A mobile device in particular smartphone, comprising an apparatus according to claim 14.

16. A non-transitory computer-readable medium with program code stored thereon for performing the method according to claim 1, when the computer code is executed on a computer processor apparatus.

* * * * *